Inventor
William Shiel Caisley

United States Patent Office 3,538,793
Patented Nov. 10, 1970

3,538,793
EXTRUSION OF HELICALLY FLUTED CUTTING TOOLS
William Shiel Caisley, 22 Farm View Road, Kimberworth, Rotherham, Yorkshire, England
Filed Dec. 12, 1967, Ser. No. 689,890
Claims priority, application Great Britain, Dec. 22, 1966, 57,504/66
Int. Cl. B21k 5/02
U.S. Cl. 76—108    7 Claims

ABSTRACT OF THE DISCLOSURE

A method if producing, by extrusion, helically fluted cutting tool bodies possessing a shank, comprises partially extruding a blank through a die of requisite helical form, withdrawing the extruded product from the die by linear movement accompanied by positive relative rotation between the product and the die about the product axis, the rate of relative rotation being so related to the rate of linear movement that a point on the surface of the product moves along the desired helix, relative to the die. There is also provided apparatus for producing tool bodies by the above method, comprising means for simultaneously withdrawing the extruded product from the die and for effecting positive rotation of the product relative to the die.

---

The invention relates to a method and apparatus for the production, by extrusion, of helically fluted cutting tool bodies possessing a shank, such as twist drills, reamers, endmills, in a form requiring little subsequent finishing.

Such extrusion method, basically, is comprised of extruding a blank located in a bore in a container or pressure chamber by means of a plunger through a die of requisite helical form aligned axially with the bore of the container or pressure chamber, the process being arrested after partial extrusion, the unextruded portion of the blank forming the shank of the finished cutting tool. The blank is, preferably but not necessarily, of composite form consisting of an expensive tool steel portion welded to a relatively inexpensive carbon steel or low alloy steel portion arranged so that only the expensive tool steel passes through the extrusion die thus forming the body or cutting portion of the finished tool. At this stage in the process the die and paritally extruded blank are in intimate contact and the problem remaining is their separation.

This can be carried out by the use of split dies which are separated from the extrude by movement at right angles to the axis, but this involves the removal and reinsertion of the die parts. Another method is to use a freely rotatable die so that by gripping the shank of the extrude and retracting the extrude from the die the helically fluted portion of the extrude is allowed to withdraw linearly from the die as the die rotates.

In such second method there is a tendency for the helically formed flutes to straighten under the action of the resistance forces upon withdrawal from the die. Since the magnitude of such forces is not controllable nor predictable, the result is tools having widely different helix angles produced from one die, and/or tools having uncontrolled variation of helix angle along their extruded length. Such results are highly undesirable since small variations of helix angle from the desired helix angle have a marked effect upon the performance of the finished cutting tool.

One means of minimizing such inaccuracies is to allow the extrude to cool to such an extent before extraction that the resistance to deformation of the material is sufficiently large to overcome the withdrawal forces. However, such measures lead to increased cycle times and hence lower production rates. A further method is to ensure as far as possible the efficient lubrication of the extrude as it passes through the die at this stage but this procedure is not entirely successful in eliminating variation of helix.

One object of the present invention is to control the consistency and accuracy of helix angle between extruded products and to obviate the need to cool the extrude before withdrawal.

This is accomplished by means of positive rotation of the extruded product during withdrawal from and relative to the die synchronized with the linear movement of the extruded product in such a way as to impart the correct helical movement to the extruded product relative to the die.

The invention accordingly provides the basic extrusion method as defined above for the production of helically fluted cutting tool bodies in which the extruded is withdrawn from the die by linear movement accompanied by positive relative rotation between the product and the die about the product axis, the rate of relative rotation being so related to the rate of linear movement that a point on the surface of the product moves along the desired helix, relative to the die.

Such a method has a further advantage in that not only does it prevent errors of helix angle occurring during withdrawal but it corrects errors of helix angle produced during extrusion.

This is important since it is well known that hitherto the production of accurate helically fluted or grooved products by extrusion demands dies of unusually long bearing length. Manufacture of such dies is both costly in material since the highly alloyed die steels and super alloys must be used for the hot extrusion of cutting tool steel, and in time, since such die forms can only be satisfactorily produced by spark erosion or electro-chemical machining. Moreover, the use of a long bearing in the die increases the frictional forces encountered and hence the extrusion pressures used.

However, by use of the present invention the bearing length of the die can be reduced without detriment to the extruded products, hence reducing the cost of dies.

Furthermore, the use of positive rotation of the extruded product in this way makes it possible to produce accurately any desired helix angle within wide limits from one die of, for example, prismatic form having zero helix angle, thus enabling tools of different helix angles to be produced from the same die and also enabling tools having a controlled variable helix to be produced.

In carrying out the above method the extruded product may be withdrawn from the die by separating movement between the die and the container or pressure chamber, the shank of the product being held in the bore of the container or pressure chamber. To ensure that the shank is so held it is preferred that the bore of the container or pressure chamber is formed with one or more internal helical splines or grooves of the opposite hand to the helix of the flutes, the splines or grooves which may be short, extending to the mouth of the container or pressure chamber bore nearer to the die. During extrusion the blank is formed to mate with the splines or grooves which serve to grip the shank during the subsequent withdrawal of the extruded product from the die. After withdrawal the shank may be pushed out of the container in the direction of the original extrusion (e.g. by means of the extrusion plunger).

The invention also provides apparatus for use in the production, by extrusion, of helically fluted cutting tool bodies possessing a shank, which apparatus comprises an extrusion die of requisite helical form, a blank container or pressure chamber having a bore aligned with the die, means for forcing a part of a blank from the bore of the container or pressure chamber through the die, means for effecting relative axial separating movement between the container or pressure chamber and the die to withdraw the extruded part of the blank through the die and means for positively effecting relative rotation between the die and the extruded part of the blank around the axis thereof during said separating movement, the rates of withdrawal and rotation being so co-related that a point on the surface of the extruded part follows the desired helix relative to the die.

In a preferred form of the apparatus the bore of the container or pressure chamber has one or more internal splines or grooves of the opposite hand to the helix of the flutes, which splines or grooves extend to the mouth of the bore nearer to the die.

A specific embodiment of the invention is more particularly described as follows by way of example and with reference to the accompanying drawings, in which.

Figure 6:
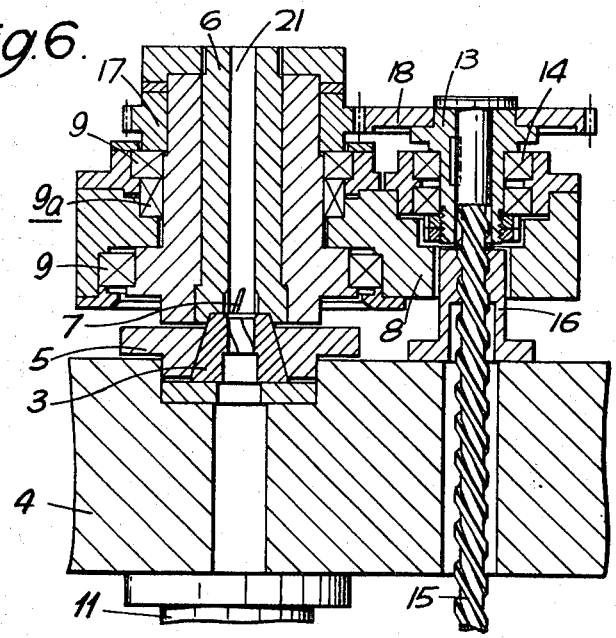
FIG. 6 is an enlarged view of part of the press shown in FIG. 1.

In the press shown in the drawings an extrusion plunger 1 is located on a top moving platen 2. An extrusion die 3 with internal helical form corresponding to the cutting tool to be extruded is located in a fixed platen 4 and secured by a retaining ring 5. A container or pressure chamber 6 consists of a hardened tool steel body possessing a through hole or bore 21 of diameter corresponding to the shank of the cutting tool to be produced, but having a helically splined or grooved portion 7 (FIG. 6) of opposite hand to that possessed by the die adjacent to it, the minor diameter of such splines or grooves being equal to the diameter of the bore of the container. The splines or grooves also extend to the mouth of the bore of the container.

The container 6 is prestressed by one or more shrink rings and is mounted in a crosshead 8 so that its bore 21 is aligned axially with both the plunger and die axis. The container 6 is rotatable with respect to the crosshead 8, the container being supported on roller bearings 9 and a thrust ball bearing 9a.

Crosshead 8 is linearly movable upwards and downwards with respect to fixed platen 4 by means of columns 11 connected between the crosshead and a bottom moving platen 12.

Also located in crosshead 8 is a control shaft housing 13 supported on taper roller bearings 14 for rotation with respect to the crosshead. A helically splined control shaft 15 is keyed into housing 13 and engages with sleeve 16 possessing the corresponding internal splined form and rigidly fixed to platen 4.

The container 6 is constrained to rotate at the same angular velocity as control shaft 15 but in the opposite direction by means of gear wheels 17 and 18 attached to the container and control shaft housing respectively and engaged in 1:1 ratio.

The splines of control shaft 15 have the same helical lead as that desired on the cutting tool to be produced but of opposite hand.

Figure 2:
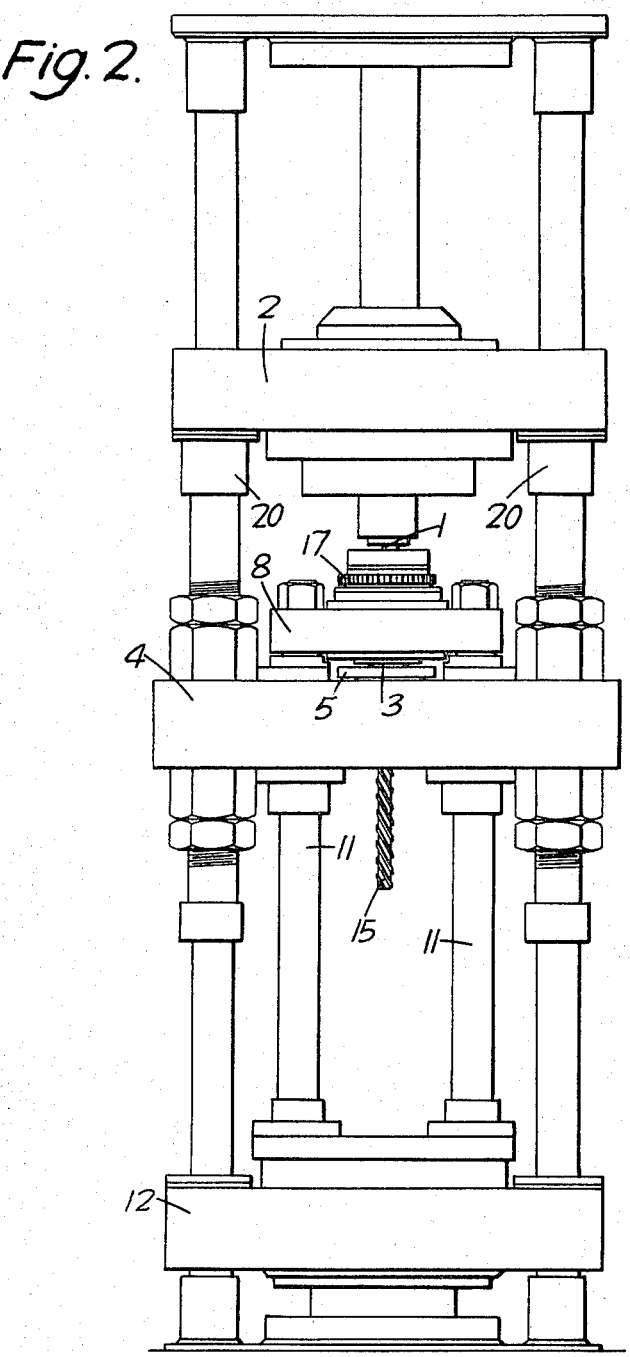
FIGS. 2 to 4 are front views of the press showing successive stages in the operation thereof.

FIG. 2 shows the arrangement at the end of extrusion.

Figure 3:
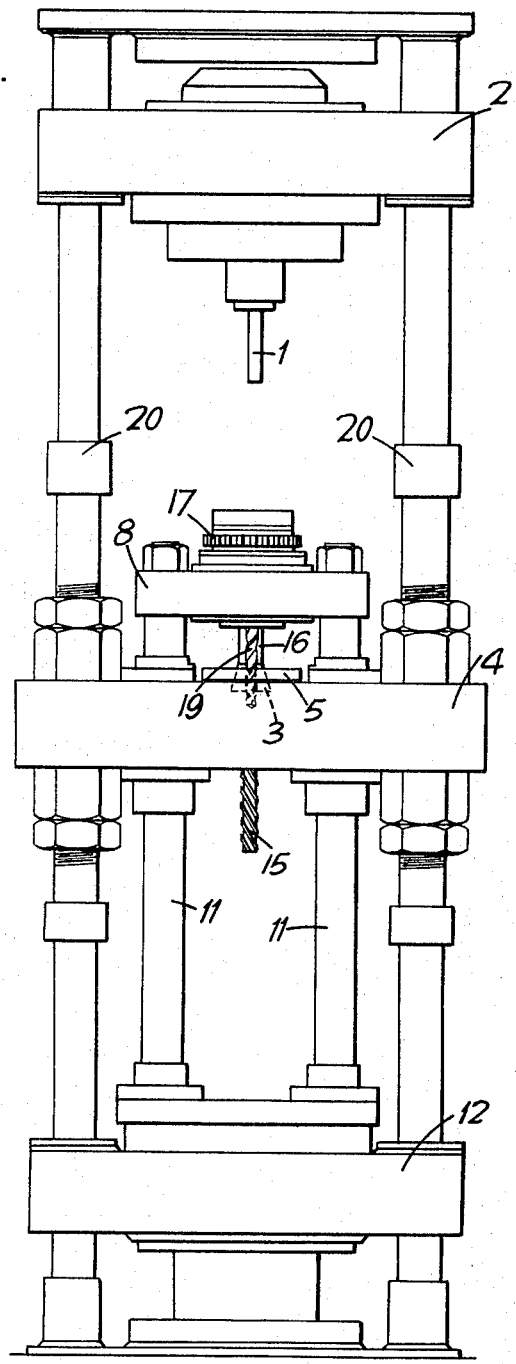
Figure 4:
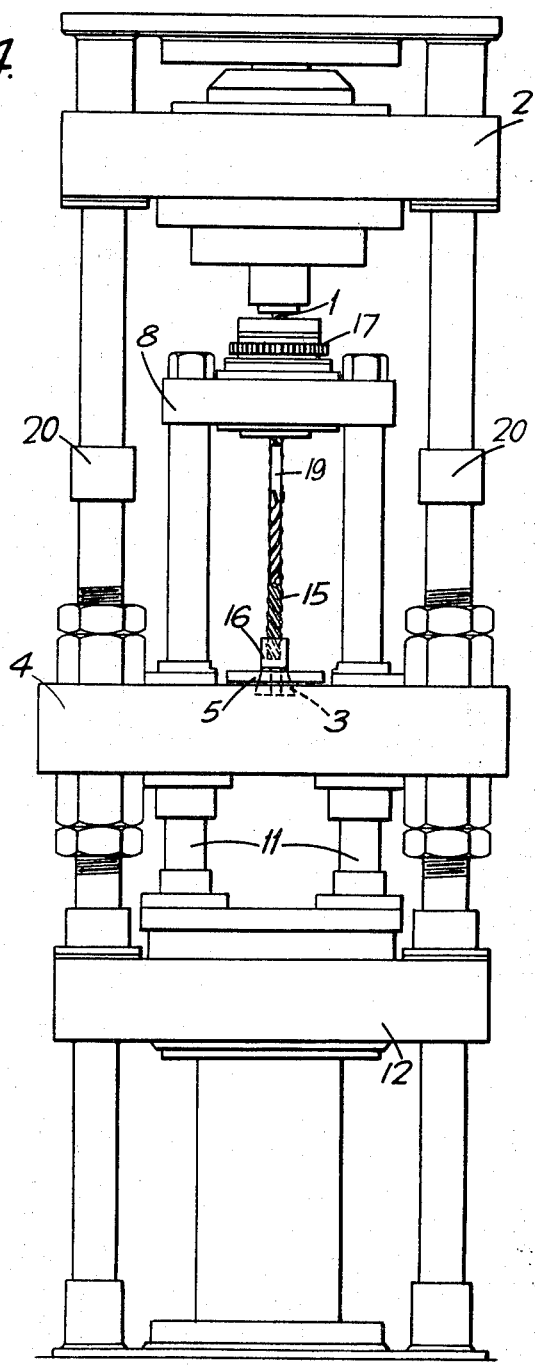
Figure 5:
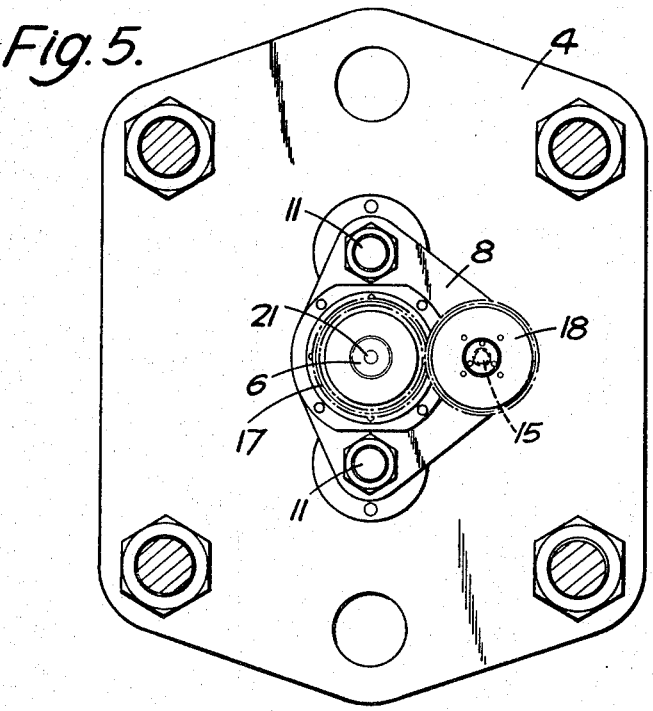
FIG. 5 is a section on the line 5—5 in FIG. 1.

FIGS. 3 and 4 show the arrangement during extraction of the extrude 19, FIG. 3 illustrating extraction from the die, and FIG. 4 illustrating subsequent ejection from the container.

Figure 1:
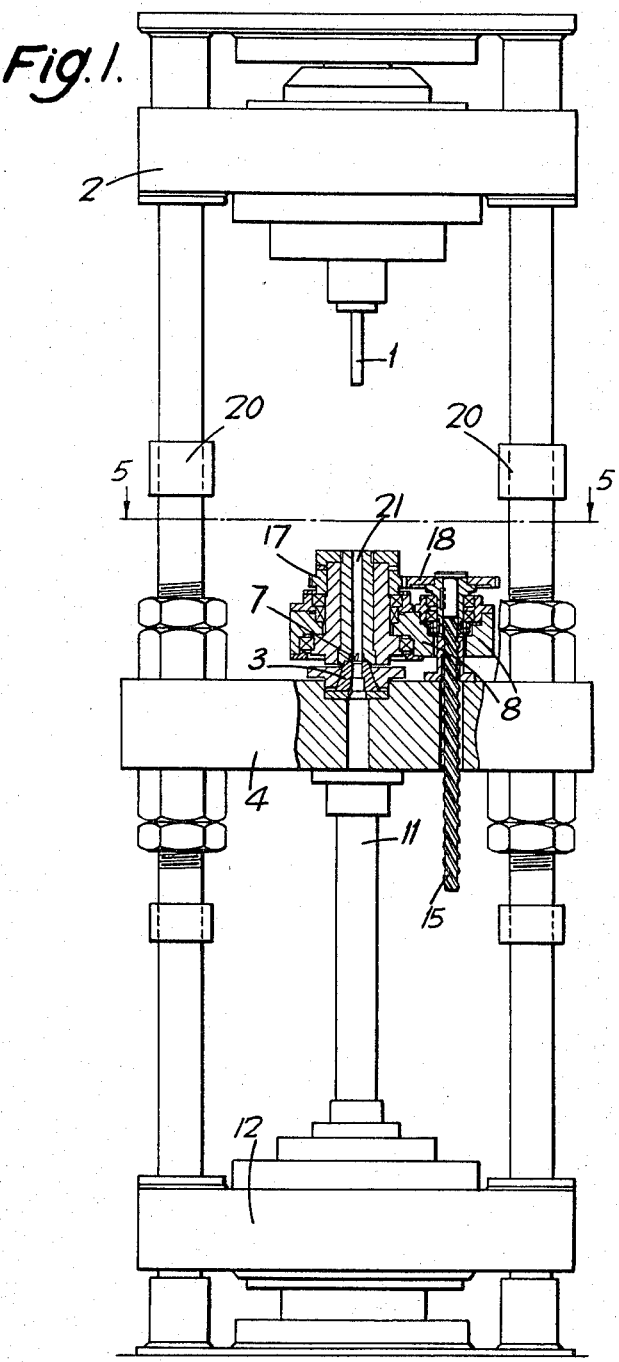
FIG. 1 is a side view, partly in section, of a double-acting press incorporating the invention.

The steps of the complete extrusion process are as follows:

With the tooling in the positions shown in FIG. 1, i.e. with the container 6 and die 3 in contact, a heated extrusion blank is placed inside the container bore 21.

The plunger 1 is caused to enter the bore 21 of container 6 under load thus contacting the heated blank.

The blank, firstly, upsets to fill the container bore thus assuming the same helically splined or grooved form as that possessed by the bore of the container adjacent to the die and secondly when upsetting is complete, commences to extrude through the die 3, whilst maintaining complete filling of the helically splined or grooved portion 7.

Extrusion is arrested (see FIG. 2) by contact between the top moving platen 2 and adjustable positive stops 20 when the extruded length is sufficient to form the body or fluted portion of the cutting tool whilst the unextruded length of the blank is sufficient to form the shank of the cutting tool.

Platen 2 is then raised and the crosshead 8 is retracted relative to the die 3 and fixed platen 4 by upward movement of bottom moving platen 12.

The resultant simultaneous upward movement of the control shaft 15 through the sleeve 16 causes the control shaft to rotate, which in turn, by means of gear wheels 17 and 18, causes the container 6 to rotate at the required helical lead. Since the helix of the helically splined or grooved portion 7 is of opposite hand to the helical movement of the container, the extrude 19 is firmly gripped in the container, hence effecting withdrawal of the extrude from the die 3 as shown in FIG. 3.

To remove the extrude from the container, upward movement of bottom platen 12 is continued so that plunger 1 contacts the top face of the blank (see FIG. 4). Pressure is applied and since the extrude 19, now free from the die, is able to rotate with respect to the container, the pressure effects ejection of the extrude from the container.

The crosshead 8 is then fully lowered and the machine is ready for the next cycle.

It is to be appreciated that whereas in the example described, the container is rotated and the die held stationary during withdrawal, it is within the invention positively to rotate the die during withdrawal, the container being held against rotation or rotated at a different rate or in the opposite direction.

Furthermore, whilst the method of positive rotation by means of control shaft and sleeve as described in the example is perhaps the simplest method, other means for such positive rotation may be used and are within the scope of the invention.

I claim:

1. A method of producing by extrusion helically fluted cutting tool bodies possessing a shank, said method comprising the steps of extruding from a pressure chamber a part of a rod blank located in the chamber through a die of helical form aligned axially with the chamber, retaining the remainder of the blank, which forms the shank of the tool, within the chamber and holding said blank against movement therein, withdrawing the extruded portion of the product from the die by separating movement between the die and the pressure chamber in the direction of the axis of the extruded product, during such separating movement effecting positive relative rotation between the die and the pressure chamber about the axis of the product at a given rate by a drive means separate from the workpiece, and relating said rate to the rate of separating movement so that each part of the surface of the extruded portion of the product is caused to move along the desired helix relative to the die as it is withdrawn therefrom.

2. The method as claimed in claim 1, including the additional step of forming during extrusion the remainder of the blank to make a helical spline and groove engagement with at least one helical groove in the pressure chamber of the opposite hand to the helix of the die so that the groove holds the remainder of the blank against rotation in the chamber during subsequent withdrawal of the extruded product from the die.

3. The method as claimed in claim 1, including the additional step of pushing the shank out of the pressure chamber in the direction of the original extrusion by means of a plunger after withdrawal of the extruded product from the die.

4. Apparatus for use in the production, by extrusion of helically fluted cutting tool bodies possessing a shank, said apparatus comprising an extrusion die of helical form, a pressure chamber aligned with the die and having a mouth open towards the die, means for extruding a part of a rod blank from within the pressure chamber out of the mouth and through the die, the unextruded portion of the blank remaining held in the pressure chamber, means for effecting relative axial separating movement between the pressure chamber and the die to withdraw the extruded part of the blank through the die, and means separate from the workpiece for positively effecting relative rotation between the die and the pressure chamber about the axis of the product during said seperating movement at a rate so related to the rate of axial separating movement that each part of the surface of the extruded portion of the product is caused by such relative rotation to move along the desired helix relative to the die as it is withdrawn therefrom.

5. Apparatus as claimed in claim 4 in which the pressure chamber has at least one internal helical groove of the opposite hand to the helix of the die, which groove extends to the mouth of the pressure chamber.

6. Apparatus as claimed in claim 4 in which the means for effecting the said separating movement between the pressure chamber and the die comprise means for moving the pressure chamber away from the die, the last-mentioned means including a movable platen and guide bars extending between the platen and the pressure chamber.

7. Apparatus as claimed in claim 4 in which the pressure chamber is mounted for rotation about the axis of the die and the means for positively effecting relative rotation between the die and the pressure chamber during said separating movement comprise a helically splined control shaft held for longitudinal movement with the pressure chamber and engaged within a sleeve mounted in fixed relation with the die, the sleeve possessing an internal helically splined form corresponding to that of the die and mating with the helical splines on the control shaft so that the shaft is caused to rotate during the separating movement, and drive means interconnecting the control shaft and the pressure chamber for effecting rotation of the pressure chamber at the same angular velocity as that of the control shaft.

References Cited

UNITED STATES PATENTS

| 3,242,712 | 3/1966 | Dalton et al. | 72—256 X |
|---|---|---|---|
| 2,954,121 | 9/1960 | Benson | 72—257 |
| 3,190,101 | 6/1965 | Caisley | 72—257 |
| 2,764,042 | 9/1956 | Götze. | |

CHARLES W. LANHAM, Primary Examiner

A. L. HAVIS, Assistant Examiner

U.S. Cl. X.R.

72—257, 272; 76—5